United States Patent [19]

Hubbell

[11] 3,816,012
[45] June 11, 1974

[54] WIRE ROPE SOCKET FITTING
[75] Inventor: Clifton H. Hubbell, Downers Grove, Ill.
[73] Assignee: Sauerman Bros., Inc., Bellwood, Ill.
[22] Filed: May 11, 1972
[21] Appl. No.: 252,470

[52] U.S. Cl. .............................. 403/369, 403/386
[51] Int. Cl. ............................................ B16g 11/04
[58] Field of Search .......... 24/126 R, 126 A, 126 C, 24/123 E, 125 M, 136 R, 136 L, 136 B; 403/369, 386

[56] References Cited
UNITED STATES PATENTS
| 601,099 | 3/1898 | Kohinka | 24/136 R |
| 849,065 | 4/1907 | Guttzeit | 24/126 |
| 1,476,218 | 12/1923 | Premro | 24/126 C |
| 3,351,986 | 11/1967 | Johnson | 24/126 R |

FOREIGN PATENTS OR APPLICATIONS
| 663,631 | 7/1936 | Germany | 24/125 M |

Primary Examiner—Bobby R. Gay
Assistant Examiner—Kenneth J. Dorner
Attorney, Agent, or Firm—Hofgren, Wegner, Allen, Stellman & McCord

[57] ABSTRACT

A socket fitting for use with wire rope including wedge means received in a socket to be clamped to the wire rope as a result of a wedging action produced by a tension applied to the rope tending to draw the rope through the socket. Securing means are provided on the wedges for maintaining the wedge elements clamped to the wire rope notwithstanding a discontinuation or reversal of the tension forces. Means are further provided on the wedges for effectively precluding withdrawal of the wedges from the socket as by such a reversal of the tension force.

7 Claims, 3 Drawing Figures

PATENTED JUN 11 1974  3,816,012 though the socket by the reaction forces of the wedging surfaces of the socket thereagainst tending to cause the rope and wedges to move longitudinally toward the enlarged end of the wedging socket.

SUMMARY OF THE INVENTION

The present invention comprehends an improved socket fitting for use with wire rope wherein means are provided for effectively maintaining the wedges clamped to the wire rope and preventing the longitudinal withdrawal of the clamped wedges outwardly through the socket. The means for maintaining the clamped association of the wedges and wire rope are adapted to provide a maximum retaining force at the leading portion of the wedges forwardly of the socket. The wedges include forward extensions projecting forwardly of the socket when initially assembled in the socket about the wire rope. The retaining means comprises means embracing the forward extensions of the wedges and forcibly urging the extensions toward each other to clamp the wire rope therebetween. The retaining means further projects transversely outwardly so as to cause the socket to have interference therewith in the event of a longitudinal outward movement of the wedges and wire rope clamp therebetween, thereby positively preventing withdrawal of the wedges longitudinally through the socket. Thus, the clamp retention means synergistically defines a positive wedge withdrawal-prevention means.

The clamp retention and withdrawal-prevention means is extremely simple and economical of construction while yet providing an improved wedge socket clamp effectively avoiding the problems of the prior art devices and providing a high degree of safety in the use of the clamp.

BRIEF DESCRIPTION OF THE DRAWING

Other features and advantages of the invention will be apparent from the following description taken in connection wtih the accompanying drawing wherein.

DESCRIPTION OF THE PREFERRED EMBODIMENT

Figure 1:
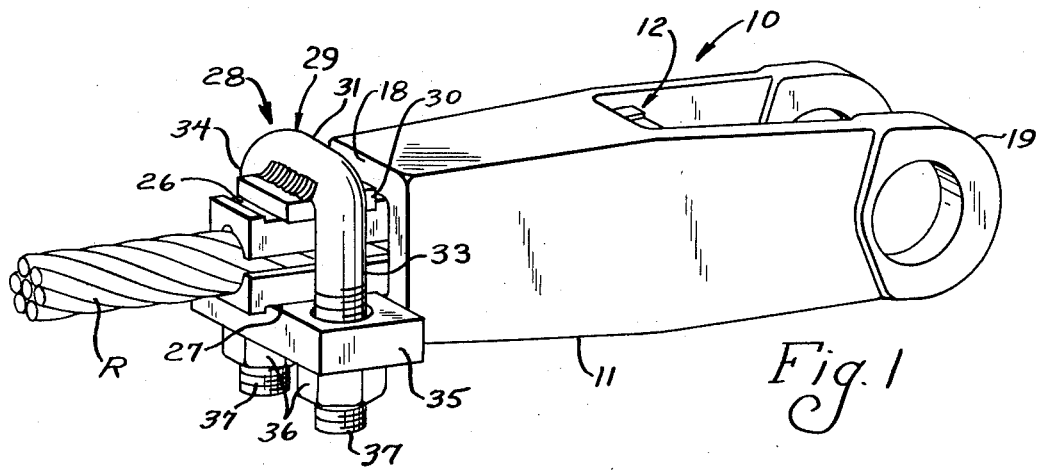
FIG. 1 is a perspective view of a socket fitting embodying the invention secured to the end of a wire rope.

In the exemplary embodiment of the invention as shown in the drawing, a socket fitting generally designated 10 is shown to comprise a wedge fitting structure including a socket 11 and a pair of wedge clamps 12 and 13. The socket 11 defines a longitudinal through-opening 14 including a pair of opposed wedging surfaces 15 and 16. The opening 14 opens rearwardly through the rear, or outer, end 17 of the socket, and forwardly through the front, or inner, end 18 of the socket with the wedging surfaces being inclined so as to cause the forward end of the opening 14 to be the narrow end. The socket may include a rear connector portion 19 for connection of the fitting to associated apparatus (not shown).

The wedge elements 12 and 13 define outer wedge surfaces 20 and 21, respectively, adapted to engage the socket wedge surfaces 15 and 16 for wedging the elements 12 and 13 against the end 22 of a wire rope R extending longitudinally therebetween. The wedges define opposed rope engaging surfaces 23 which may be helically contoured to conform to the helical outer surface of the wire rope for improved clamping coaction therewith.

Figure 2:
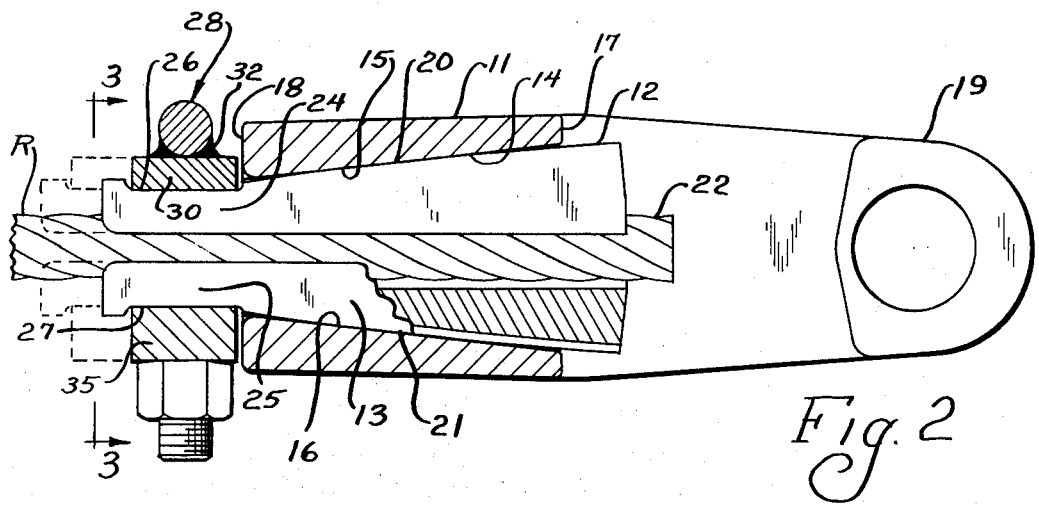
FIG. 2 is a longitudinal section thereof.
Figure 3:
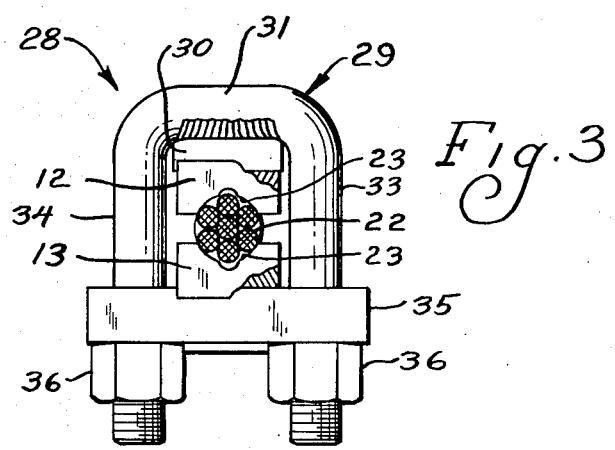
FIG. 3 is a transverse section taken substantially along the line 3—3 of FIG. 2.

As best seen in FIGS. 1, and 2, each of the wedges is provided with a forward extension projecting forwardly of the front end 18 of the socket in the initial arrangement of the clamp. More specifically, wedge 12 includes a front extension 24 and wedge 13 includes a front extension 25. Extension 24 is provided with an outwardly opening channel 26 and extension 25 is provided with an outwardly opening channel 27.

A clamp-retaining and withdrawal-preventing device generally designated 28 is provided in association with the wedge extensions 24 and 25 for maintaining the clamped association of the wedges with the wire rope end 22 and preventing withdrawal of the wedges clamped to the wire rope through the socket opening 14 such as by a force acting thereon to the right, as seen in FIG. 2. Device 28 includes a U-bolt 29 having a bar 30 secured to the inside of the bight 31 as by welding 32. Bar 30 is adapted to be received in channel 26 of wedge extension 24. The legs 33 and 34 of the U-bolt extend through a bar 35 adapted to be received in the channel 27 of wedge extension 25. Suitable nuts 36 are threaded to the threaded ends 37 of the U-bolt legs 33 and 34 to urge the bar 35 toward the bar 30 and thereby forcibly clamp the wedge extensions 24 and 25 against the wire rope to maintain the wedges 12 and 13 in clamped association with the wire rope at all times.

As shown in FIG. 2, the device 28 is secured to the wedge extensions after they are brought through the opening 14 to be disposed forwardly of socket end 18 with the wedging surfaces 20 and 21 of the wedges contacting the wedging surfaces 15 and 16 of the socket. The nuts 36 of the device 28 are tightened with the wire rope being adjusted between the wedges 12 and 13 to have the convolutions thereof set accurately in the helical grooves 23 of the wedges.

Application of a tension force to the wire rope R in the normal direction (to the left as seen in FIG. 2) now urges the clamped wedge and wire rope assembly to the left such as to the dotted line position of the wedge extensions, as shown in FIG. 2. Such forward longitudinal movement augments the clamping action of the wedges against the wire rope as a result of the wedging action effected by the forceful engagement of wedge surfaces 20 and 21 with the socket surfaces 15 and 16. It has been found that the cooperating clamping action of device 28 and wedging action of socket 11 may provide a holding strength comparable to or greater than the holding strength of the wire rope itself, thereby assuring positive retention of the fitting 10 on the wire rope substantially up to the breaking point of the rope itself.

In certain applications, the tension forces acting in the normal direction at times may be discontinued and at times even reverse forces may be applied to the rope tending to urge the wedge clamp and rope assembly rearwardly through the socket, or to the right as seen in FIG. 2. A release of the clamping engagement of the wedges 12 and 13 with the wire rope is effectively precluded notwithstanding the elimination of the augmenting wedging action of the socket against the wedges under such conditions as a result of the maintained positive clamping force effected by device 28 at all times. Further, the bars 30 and 35 of device 28 are prevented from moving longitudinally rearwardly past socket end 18 by the interference therebetween, as shown in FIG. 2, thereby effectively preventing longitudinal withdrawal of the assembled wedges and wire rope notwithstanding the application of rearward forces to the assembly.

Thus, clamp 10 functions to provide a proper clamping action of the wedges against the wire rope at all times with the amount of clamping force being increased automatically from a preselected minimum as the tension forces acting on the wire rope tending to effect the wedging action increase. The minimum clamping force effected by device 28 is sufficient to maintain the desired clamped association of the wedges with the wire rope in the complete absence of any wedging action by the socket against the wedges originally.

It has been found that the use of the positive clamping device 28 maintains the wedges 12 and 13 against longitudinal displacement which may occur with the devices of the prior art. Such displacement causes a loosening of the wedging means permitting a failure of the connection. By eliminating such displacement, a positive retained clamping action is obtained in the fitting 10.

The foregoing disclosure of specific embodiments is illustrative of the broad inventive concepts comprehended by the invention.

I claim:
1. A socket fitting for use with wire rope, comprising: a socket having a through bore defined by opposite, wedge surfaces approaching each other at an inner end of the bore; a first wedge element in said bore having an outer surface engaging one of said wedge surfaces; a second wedge element in said bore having an outer surface engaging the other of said wedge surfaces, said wedge elements having inner surfaces adapted to engage a wire rope extended longitudinally through said bore therebetween, said wedge elements being caused to clamp said wire rope effectively positively against longitudinal withdrawal through said inner end of the bore as a result of a wedging of the wedge element against said wire rope by said wedge surfaces of the socket, said wedge elements having radially movable inner ends projecting from the inner end of said bore; and securing means secured to said projecting inner ends of the wedge elements for adjustably clamping said inner ends of the wedge elements to said wire rope notwithstanding a discontinuation of the wedging of said wedge elements by said wedge surfaces, said securing means and socket defining cooperating shoulders for positively limiting longitudinal outward movement of the clamped wire rope and wedge elements in said socket bore.

2. The socket fitting of claim 1 wherein cooperating abutment means are provided on said socket and securing means for limiting the outward movement of the clamped wire rope and wedge elements in said socket bore.

3. The socket fitting of claim 1 wherein said wedge elements define extension portions extending inwardly from said inner end of the socket bore each defining a transversely outwardly opening channel and said securing means is secured to said extensions with portions of the securing means being received in said channels.

4. The socket fitting of claim 1 wherein said wedge elements define extension portions extending inwardly from said inner end of the socket bore each defining a distal transversely outturned flange and said securing means is secured to said extensions longitudinally outwardly of said flange.

5. The socket fitting of claim 1 wherein said securing means comprises means removably secured to the wedge elements.

6. The socket fitting of claim 1 wherein said securing means comprises a removable clamp.

7. The socket fitting of claim 1 wherein said wedge elements include portions exposed outwardly of the wedge socket means and said securing means engages said exposed portions at a position spaced from said socket means in the made-up arrangement of the fitting subsequent to the exertion of said longitudinal pull on the wire rope.

* * * * *